US011361268B1

(12) United States Patent
Fisher et al.

(10) Patent No.: US 11,361,268 B1
(45) Date of Patent: Jun. 14, 2022

(54) BUSINESS RULES MANAGEMENT SYSTEM

(71) Applicant: Fannie Mae, Washington, DC (US)

(72) Inventors: Mark Fisher, Washington, DC (US); Christopher Engles, Washington, DC (US); Sudha Uppaluri, Washington, DC (US); Joy Vaughan, Washington, DC (US)

(73) Assignee: Fannie Mae, Washington, DC (US)

( * ) Notice: Subject to any disclaimer, the term of this patent is extended or adjusted under 35 U.S.C. 154(b) by 790 days.

(21) Appl. No.: 15/367,306

(22) Filed: Dec. 2, 2016

Related U.S. Application Data

(60) Provisional application No. 62/382,236, filed on Aug. 31, 2016.

(51) Int. Cl.
*G06Q 10/06* (2012.01)
(52) U.S. Cl.
CPC ....... *G06Q 10/0637* (2013.01); *G06Q 10/067* (2013.01)
(58) Field of Classification Search
None
See application file for complete search history.

(56) References Cited

U.S. PATENT DOCUMENTS

| | | | | |
|---|---|---|---|---|
| 7,461,020 B2* | 12/2008 | Kemper | ............. | G06Q 30/0283 705/35 |
| 7,555,459 B2* | 6/2009 | Dhar | ......................... | A61J 9/00 705/38 |
| 7,809,633 B2* | 10/2010 | Nolan, III | ............ | G06Q 20/382 705/38 |
| 8,024,265 B2* | 9/2011 | Kemper | ................. | G06Q 40/00 705/38 |
| 2004/0064402 A1* | 4/2004 | Dreyer | ................. | G06Q 40/025 705/38 |
| 2004/0122717 A1* | 6/2004 | Hancock | ................ | G06Q 40/08 705/4 |
| 2004/0128230 A1* | 7/2004 | Oppenheimer | ........ | G06Q 20/10 705/38 |
| 2006/0074793 A1* | 4/2006 | Hibbert | .................. | G06Q 40/00 705/38 |

(Continued)

OTHER PUBLICATIONS

Phan, Tan, et al. "Quality-driven business policy specification and refinement for service-oriented systems." International Conference on Service-Oriented Computing. Springer, Berlin, Heidelberg, 2008. (Year: 2008).*

(Continued)

*Primary Examiner* — Thomas L Mansfield
(74) *Attorney, Agent, or Firm* — Foley & Lardner LLP

(57) ABSTRACT

Computer systems are used to facilitate the sale of mortgages into the secondary market. For example, the computer systems are used to facilitate the administration of loan delivery and other business rules across multiple customer-facing applications. The computer systems provide a shared service for customer-facing applications to integrate with a centralized business rules engine. The computer systems enable the integrated applications to request specific groups or categories of business rules to be executed by the centralized business rules engine. The computer systems request execution of stored business rules based on a loan, format the results, and provide feedback to the calling applications based on the results.

18 Claims, 12 Drawing Sheets

(56) References Cited

U.S. PATENT DOCUMENTS

| | | | |
|---|---|---|---|
| 2010/0205616 A1* | 8/2010 | Lai .......................... | G06F 9/485 |
| | | | 719/320 |
| 2010/0324951 A1* | 12/2010 | Northover .............. | G06Q 10/00 |
| | | | 705/7.28 |
| 2011/0093384 A1* | 4/2011 | Oppenheimer ........ | G06Q 40/02 |
| | | | 705/38 |
| 2013/0066766 A1* | 3/2013 | Kemper ................. | G06Q 10/10 |
| | | | 705/38 |

OTHER PUBLICATIONS

Chaware, Sachin, and Aarti Karandikar. "Development of Loan Module using Business Rules Engine." Compusoft 3.7 (2014): 1007. (Year: 2014).*

* cited by examiner

| Rule ID | Msg ID | State | Rule Name | Effective Date | Expiration Date | Status | Seller ID | Application | Severity | Last Action Date ↓ | Last Action By |
|---|---|---|---|---|---|---|---|---|---|---|---|
| BR1945 | | Pending Approval | | 01/01/1900 | 12/31/2999 | Inactive | | | | 01/23/2014 02:08:2... | BRO Admin (c6uv144v) |
| BR1388 | | Pending Approval | | 01/01/1900 | 12/31/2999 | Inactive | | | | 01/23/2014 02:05:0... | BRO Admin (c6uv144v) |
| BR8002 | SM1 | Pending Approval | | 01/23/2014 | 01/31/2014 | Inactive | All Sellers | Loan Delivery | Fatal | 01/23/2014 01:00:3... | BRO Admin (c6uv144v) |
| BR1388 | SV97 | Pending Approval | | 01/01/1900 | 12/31/2999 | Inactive | 22855 | EarlyCheck, Loan Deli... | Fatal | 01/13/2014 03:15:2... | BRO Admin (c6uv144v) |
| BR1945 | SV1 | Pending Approval | | 01/01/1900 | 12/31/2999 | Inactive | 27087 | EarlyCheck, Loan Deli... | Fatal | 01/13/2014 03:11:5... | BRO Admin (c6uv144v) |
| BR270 | RE1 | Pending Approval | | 01/01/2013 | 01/05/2037 | Inactive | All Sellers | Loan Delivery | Fatal | 01/13/2014 03:11:1... | BRO Admin (c6uv144v) |
| BR1388 | SV96 | Pending Approval | | 01/01/1900 | 12/31/2999 | Inactive | 22790 | EarlyCheck, Loan Deli... | Fatal | 01/13/2014 02:59:3... | BRO Admin (c6uv144v) |
| BRD96 | TV1 | Pending Approval | | 01/13/2014 | 01/13/2014 | Inactive | 12345-678-9 | App3 | Informatio... | 01/13/2014 12:27:3... | BRO Admin (c6uv144v) |
| BR1388 | SV95 | Pending Approval | | 01/01/1900 | 02/01/2018 | Inactive | 26398 | EarlyCheck, Loan Deli... | Fatal | 01/13/2014 12:23:5... | BRO Admin (c6uv144v) |

FIG. 10

BUSINESS RULES MANAGEMENT SYSTEM

CROSS-REFERENCE TO RELATED PATENT APPLICATIONS

This application claims the benefit of and priority to U.S. Provisional Application No. 62/382,236, filed Aug. 31, 2016, which is incorporated herein by reference in its entirety.

BACKGROUND

A business rules engine is a computing system that executes one or more business rules in a production environment. The business rules are typically configured to implement legal regulations or company policy, and may be utilized to make business decisions within an organization. However, business rules engines are often inflexible, such that it is difficult to make an exception for a particular customer or transaction, or to make dynamic business decisions.

SUMMARY

One embodiment of the present disclosure relates to a method performed by a business rules management system. The method includes providing an interface to a device operated by a user of the system, wherein the interface is generated based on a business rule, receiving a request from the user via the interface, the request including a modification related to the business rule, receiving a result from a rules engine, the result based on execution of the business rule by the rules engine, and applying the modification to the result based on the request.

Another embodiment of the present disclosure relates to a business rules management system. The system includes a user interface circuit structured to provide an interface to a device operated by a user of the system, wherein the interface is generated based on a business rule, receive a request from the user via the interface, the request including a modification related to the business rule, and receive a result from a rules engine, the result based on execution of the business rule by the rules engine. The system also includes a rules management circuit structured to apply the modification to the result based on the request.

Another embodiment of the present disclosure relates to a method performed by a business rules management system. The method includes providing an interface to a seller of a loan via a network-based application, receiving loan information for the loan from the seller via the interface, sending a request to a rules engine to execute a business rule, the request based on the loan information, receiving a result from the rules engine, the result based on application of the business rule to the loan information, and applying a modification to the result, the modification applied based on its association with the business rule.

BRIEF DESCRIPTION OF THE DRAWINGS

FIG. 8 is a screen display generated by a user interface circuit, showing business rule metadata and feedback messages, according to an example embodiment.

FIG. 9 is a screen display generated by a user interface circuit, showing business rules that are awaiting approval, according to an example embodiment.

FIG. 10 is a screen display generated by a user interface circuit, showing a historical record of business rule configurations, according to an example embodiment.

DETAILED DESCRIPTION

Figure 1:
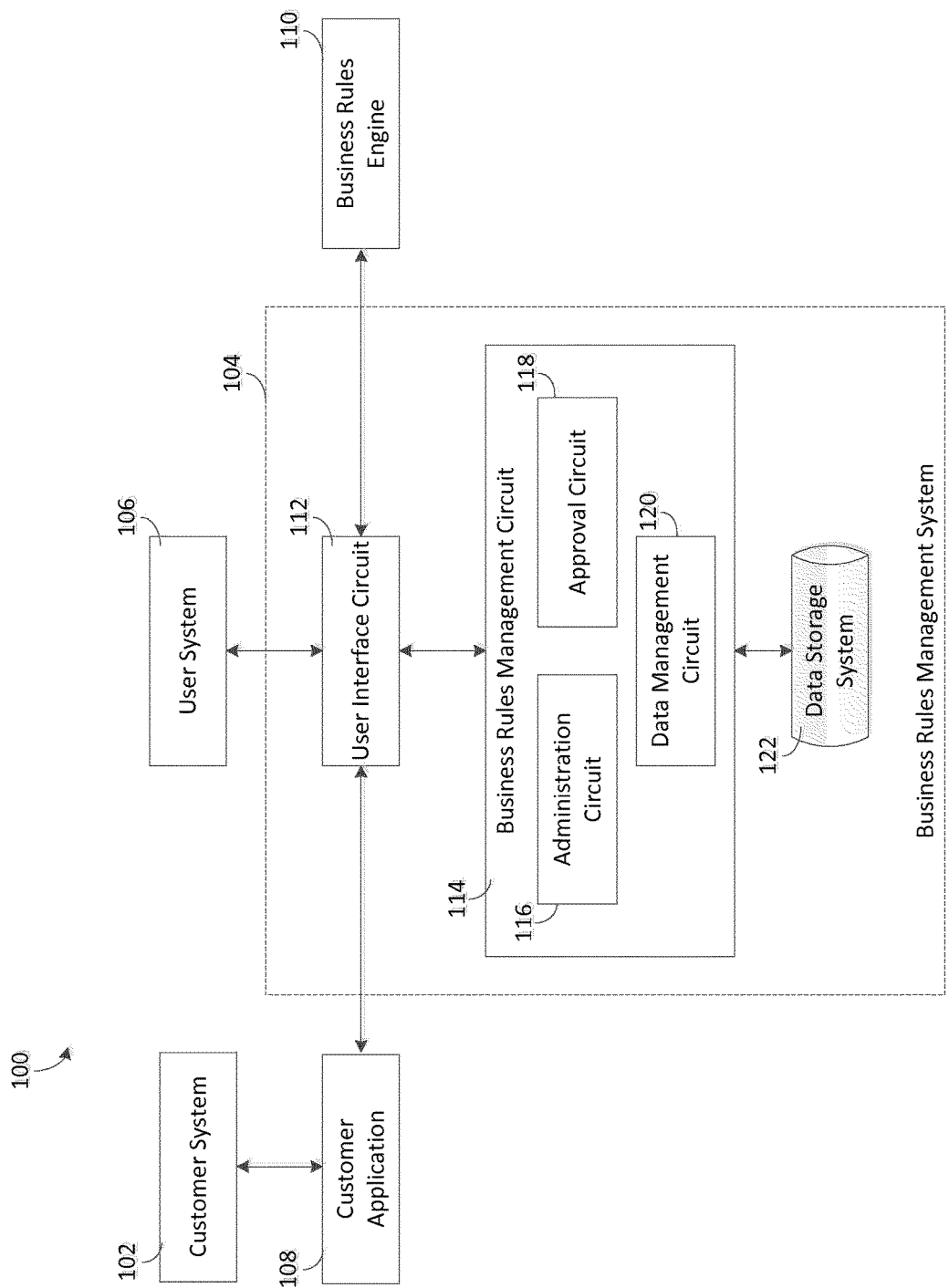
FIG. 1 is a block diagram of a computer system for implementing the systems and methods of the present disclosure, according to an example embodiment.

According to example embodiments, computer systems are used to facilitate the sale of mortgages into the secondary market. For example, the computer systems are used to facilitate the administration of loan delivery and other business rules across multiple customer-facing applications. The computer systems provide a shared service for customer-facing applications to integrate with a centralized business rules engine. The computer systems enable the integrated applications to request specific groups or categories of business rules to be executed by the centralized business rules engine. The computer systems request execution of stored business rules (i.e., based on the details of a particular loan), format the results, and provide feedback (alerts) to the calling applications based on the results.

The computer systems abstract the functions of post-business rules processing, including scheduled rule activation or deactivation, management of rules messages and severities, and application of related customer-specific overlays. According to example embodiments, the computer systems include a business rules administration tool that allows a user (e.g., administrator) to manage the applicability of a feedback message/alert for a particular business rule, including the external message sent to the customer, the severity, trigger dates, and rule logic overrides for the business rule. For example, the user can override the business rule and associated feedback message for all customers, for a particular customer or vendor, or for a particular loan or group of loans. The business rules administration tool allows the user to update a business rule without accessing the source code at the centralized business rules engine, resulting in faster production updates of rule messages, severities, and overrides. The business rules administration tool also centralizes management of business rule expression across multiple customer-facing applications.

The computer systems also include an approval workflow tool that maintains the separation of duties using specific user roles and permissions. The approval workflow tool can be used by a user (e.g., administrator, editor, etc.) to segregate responsibilities within an organization (e.g., specify which users have which capabilities). For example, the approval workflow tool can be used to restrict which users (e.g., editors, approvers, super users, administrators, etc.) are allowed to create, modify, approve, or reject business rule configurations or overrides. The approval workflow tool can also be used to establish checks and balances within an organization, requiring one or more persons to approve a change before it is implemented.

The computer systems also include a data management tool that maintains a historical record of business rule configurations. The data management tool can be used to maintain an audit trail for all user-initiated data changes within the business rule metadata and feedback messages (date, time, user, to/from data changes). For example, the data management tool can be used to view any modifications that have been made to a particular business rule over a given time period. The data management tool can also be used to execute prior versions of a particular business rule.

Referring now to FIG. 1, a computer system 100 for facilitating the management and execution of business rules is shown. As shown in FIG. 1, the system 100 includes a customer system 102, a user system 106, a business rules orchestrator 104 (or sometimes herein, "business rules management system 104"), customer-facing applications 108 (or sometimes herein, "customer application 108"), and a business rules engine 110.

The customer system 102 is a computing system associated with a customer (e.g., a seller) of the business rules management system 104 (or the associated entity). According to example embodiments, the customer is a seller of a mortgage loan (e.g., a mortgage originator) in the secondary mortgage market, or a representative thereof. The customer can include, for example, representatives for financial institutions that are capable of originating mortgage loans, such as a bank or credit union. As such, the customer system 102 includes computing systems that are associated with such financial institutions. The customer system 102 is capable of exchanging information with the business rules management system 104 via the customer-facing applications 108. In some arrangements, the customer system 102 exchanges information with the business rules management system 104 over a data network, which may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the data network includes the internet.

The user system 106 is a computing system associated with an internal user of the business rules management system 104. In example embodiments, the business rules management system 104 is operated by a purchaser of mortgages in the secondary mortgage market (e.g., a secondary market conduit). In these embodiments, the internal user can be a representative of such an entity, such as an employee of the mortgage purchaser. In some embodiments, the user system 106 includes a plurality of systems and associated users, including editors, approvers, and administrators of the business rules management system 104. The user system 106 exchanges information with the business rules management system 104 over a secure data network, which may include any of the network types referenced herein with regard to the customer system 102.

The business rules management system 104 facilitates the administration of business rules across one or more customer-facing applications 108 (or sometimes herein, "customer application 108"). The business rules management system 104 includes a user interface circuit 112, a business rules management circuit 114, and a data storage system 122. The business rules management circuit 114 is configured to receive loan-related information from integrated applications (e.g., customer application 108), and request specific groups or categories of business rules to be executed by the business rules engine 110 based on the loan-related information. The business rules management circuit 114 is also useable to abstract the functions of post-business rules processing, including to schedule business rule activation and deactivation, manage rule messages and severities, and apply customer-specific overlays. The business rules management circuit 114 facilitates controlled updates of message severities and overrides by implementing approval workflow and requirements. Further, the business rules management circuit 114 is configured to maintain a historical record of business rules configurations at the data storage system 122 and maintain an audit trail for all user-initiated data changes. The data storage system 122 is a non-transient digital memory configured to store information relating to business rules and modifications at the business rules management system 104.

The business rules engine 110 is a computing system that stores and executes business rules. In example embodiments, the business rules are based on guidelines provided by a purchaser in the secondary mortgage market (i.e., the entity operating the business rules management system 104), and the business rules are executed to determine whether the purchaser should purchase a particular loan or group of loans offered by the seller. If a business rule is triggered, indicating that one or more loans does not meet the requirements of the purchaser, the business rules engine 110 provides a feedback message to the business rules management system 104 indicating that the rule was triggered. The business rules engine 110 is configured to execute specific groups or categories of business rules based on loan information that is provided by a seller. The business rules engine 110 is configured to receive the loan information from the business rules management system 104 via the customer application 108.

The business rules management circuit 114 includes an administration circuit 116, an approval circuit 118, and a data management circuit 120. The administration circuit 116 permits internal users to manage the applicability of the feedback messages for each business rule, including the external message, severity, trigger dates, and rule logic overrides. For example, the administration circuit 116 permits the users to override a feedback message completely (i.e., to inactivate the business rule for all loans), for a particular seller or vendor (i.e., so that loans associated with the seller or vendor are not subject to the business rule), and for a particular loan or group of loans. The overrides initiated by the user may be permanent or temporary (e.g., a one-time override). In example embodiments, any overrides may be applied across all customer-facing applications or across selected applications.

The approval circuit 118 permits a user of the business rules management system 104 to specify approval requirements for any overrides or other modifications to the business rules. The approval circuit 118 can be used to maintain a separation of duties, using specific user roles and permissions, to segregate responsibilities between and within different groups (e.g., teams, departments, roles, etc.) within an organization. For example, the approval circuit 118 can be used to assign a "super user" having the ability to create, modify, approve, or reject business rules and feedback messages across all integrated applications. The approval circuit 118 can also be used to assign one or more "editors" (e.g., to create, modify) and "approvers" (e.g., to approve, reject), including based on the business rule, feedback message, or integrated application.

The data management circuit 120 is configured to maintain a historical record of business rule configurations for a designated period of time (e.g., ten years). The data management circuit 120 can be used to execute previous versions of rule configurations, including to execute rule logic in arrears. The data management circuit 120 also maintains an audit trail for all user-initiated data changes within the business rule metadata and feedback messages, including the date, time, and user associated with the changes. The data management circuit 120 is configured to draw information generated from the administration circuit 116 and information stored in the data storage system 122 to provide historical information to the internal user.

The user interface circuit 112 provides a user interface between the user system 106 and the business rules management system 104, allowing the user system 106 and the business rules management system 104 to exchange information (e.g., via a secure internet connection). For example, the user interface circuit 112 may be configured to dynamically generate web pages for presentation to internal users via the user system 106. An internal user at the user system 106 may then use those web pages to perform functions associated with the business rules management system 104, including manage the business rules and associated feedback messages, access business rule management approval requirements, and view historical information related to the business rules. As an example, the user interface circuit 112 is configured to provide a business rules administration tool to the user system 106 using information received from the administration circuit 116. The business rules administration tool is an analysis and research tool that enables the user to view the current, future, and past business rule metadata and feedback messages. Internal users having access can also manage the feedback message applicability of a particular business rule using the business rules administration tool, including the external message, severity trigger dates, and rule logic overrides.

The user interface circuit 112 is also configured to provide an approval manager tool to the user system 106 using information received from the approval circuit 118. As shown in FIG. 9, the approval manager tool provides a workflow display to the user, allowing the user to manage business rules and/or feedback messages that are awaiting approval. The user interface circuit 112 is also configured to provide a data management tool to the user (see FIG. 10) using information received from the data management circuit 120. The data management tool can be utilized to manage business rule metadata and associated feedback messages, which includes the external message, severity, source/term, and selection criteria to determine the message's applicability.

The user interface circuit 112 is also configured to provide a user interface between the customer system 102 and the business rules management system 104 in the form of the customer application 108. The customer application 108 may include one or more customer-facing applications configured to facilitate communication between a customer (e.g., lender, seller, mortgage originator, etc.) and the business rules management system 104. For example, the customer application 108 may include a loan delivery application configured to facilitate the communication of loan information from the customer to the business rules management system 104 (i.e., the loan purchaser). As another example, the customer application may include a loan quality application configured to provide lender users with access to delivery edits at any point in the lender's business process. The loan quality application may assist lenders in identifying and correcting potential eligibility and/or data issues early in their processes and prior to loan delivery. In such an example, the business rules management system may alert lenders to situation in which loans which are contemplated for sale do not meet regulations or company policy of the secondary mortgage market purchaser. As another example, the customer application may include an MBS pool production application configured to provide lenders with a tool to pool loans for a mortgage backed security. Again, in such an example, the business rules management system may alert lenders to a situation in which loans which are contemplated for pooling do not meet regulations or company policy of the secondary mortgage market purchaser.

Figure 2:
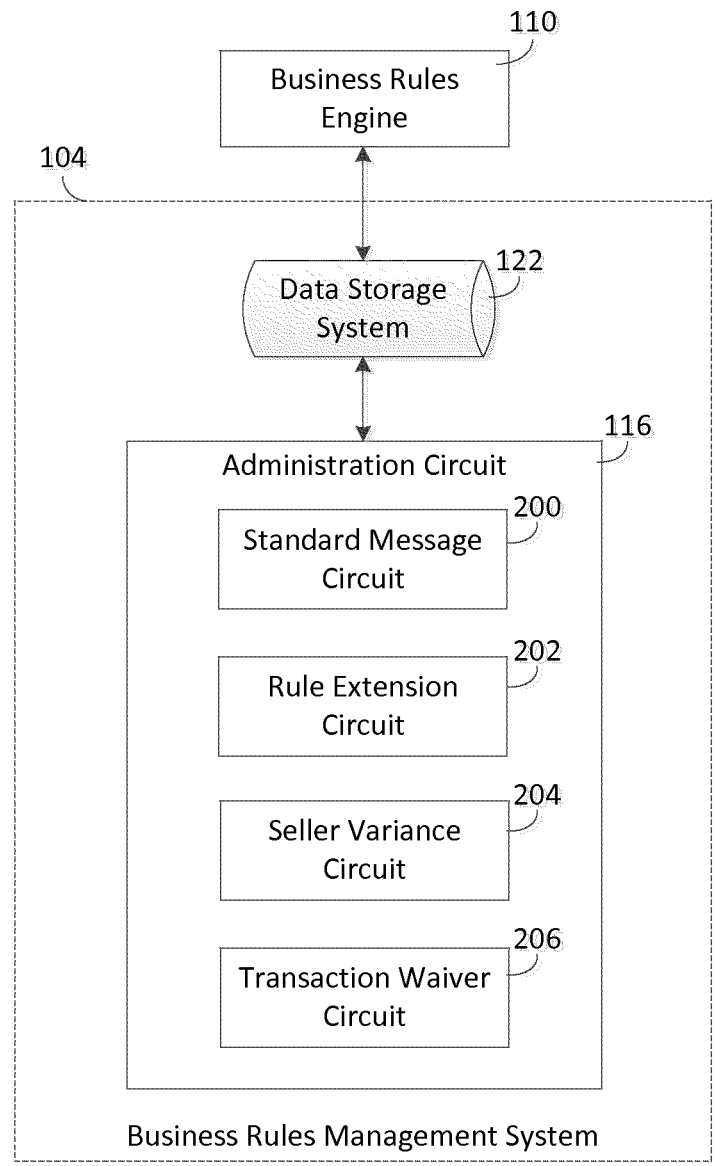
FIG. 2 is a block diagram of a business rules management system, according to an example embodiment.
Figure 3:
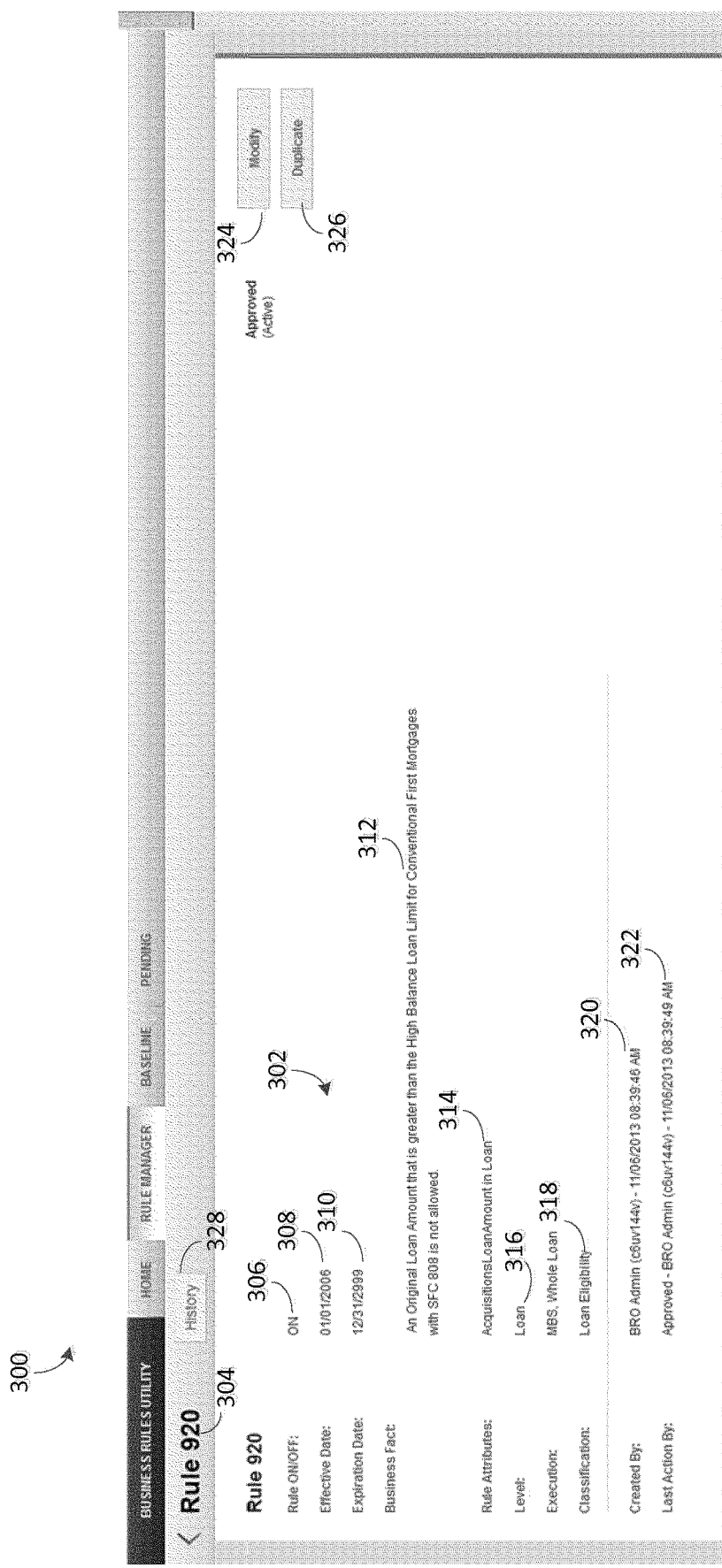
FIG. 3 is a screen display generated by a user interface circuit, showing a business rule for a purchaser in the secondary mortgage loan market, according to an example embodiment.

Referring now to FIG. 2, the administration circuit 116 of the business rules management system 104 is shown in further detail and according to an example embodiment. In this embodiment, the administration circuit 116, the data storage system 122, and the business rules engine 110 are communicably coupled. The business rules engine 110 is configured to execute one or more stored business rules and provide the result(s) to the business rules management system 104. The business rules management system 104 (e.g., the administration circuit 116) is configured to apply any applicable exceptions or modifications (e.g., overrides) to the result(s) before sending a response to the customer application 108. For example, if one or more loans triggered a feedback message when the business rules are executed, the business rules management system 104 may determine whether any exceptions or overrides apply to the one or more loans before sending an external message to the customer.

The administration circuit 116 includes a standard message circuit 200, a rule extension circuit 202, a seller variance circuit 204, and a transaction waiver circuit 206. The standard message circuit 200 may be used by an internal user to retrieve and view the standard message for a particular business rule. All business rules will have a standard message and severity that applies to all sellers (e.g., mortgage originators, lenders, etc.). The circuits 202, 204, and 206 may be used by an internal user to override a business rule (e.g., to suppress or change a standard feedback message) in some instances, as will be described in further detail below.

Referring now to FIGS. 3-10, example screen displays are shown for displaying at the user system 106. The screen displays are generated by the user interface circuit 112 based on information received from the business rules management circuit 114. The user interface circuit 112 can provide an internal user with a portal to information stored at the data storage system 122 by, for example, generating a website or network-based application with user-specific login credentials. A given user can provide login credentials (e.g., a password along with a username or an account number) to the user interface circuit 112 in order to view business rules-related information. Upon logging in, the user can be granted access to the various screen displays shown in FIGS. 3-10, which are intended to facilitate controlled updates of standard message severities and overrides by an internal user of the business rules management system 104.

Referring to FIGS. 3-7, example screen displays are shown for a business rules administration tool. The business rules administration tool and its associated screen displays are provided by the user interface circuit 112 in combination with the administration circuit 116, and using information stored at the data storage system 122. At FIG. 3, for example, screen 300 includes a heading 302 identifying the business rule selected by the user for view ("Rule 920"). The screen 300 also includes a summary overview pane 304 containing a broad summary of information relating to the selected business rule. The information provided within the pane 304 can include an activation status 306, an effective date 308, an expiration date 310, a business fact 312, rule attributes 314, a level 316, a classification 318, a creation status 320, a modification status 322, and an approval status 330. The activation status 306 can inform the user whether the rule is currently active or inactive. The effective date 308 and expiration date 310 indicate when the rule became effective and when it is scheduled to expire, respectively. The business fact 312 provides a brief explanation of the test (e.g., requirement) that will be applied when the business rule is executed. The rule attributes 314 identifies an attribute of the business rule (e.g., the acquisition's loan amount), the level 316 indicates the level at which the business rule will be applied, and the classification 318 classifies the rule by type. The creation status 320 indicates when the rule was created and the user responsible. The modification status 322 indicates when the rule was last modified and the user responsible for the modification. Finally, the approval status 330 indicates whether the business rule has been approved by the required parties (e.g., an approver, an administrator, etc.).

The screen 300 also includes a modify button 324, a duplicate button 326, and a history button 328. The user can modify portions of the business rule by interacting with the modify button 324. For example, another screen may be provided with options for modification, or certain information shown on the screen 300 may change in quality to indicate that the information can be modified by the user. The user can duplicate the business rule by interacting with the duplicate button 326. For example, the user may wish to create another rule having similar attributes to Rule 920 but with minor changes, such as having a different expiration date. The user can also review the history of Rule 920 by interacting with the history button 328. For example, the user may be able to view all modifications to the rule and associated details since the rule was created.

Figure 4:
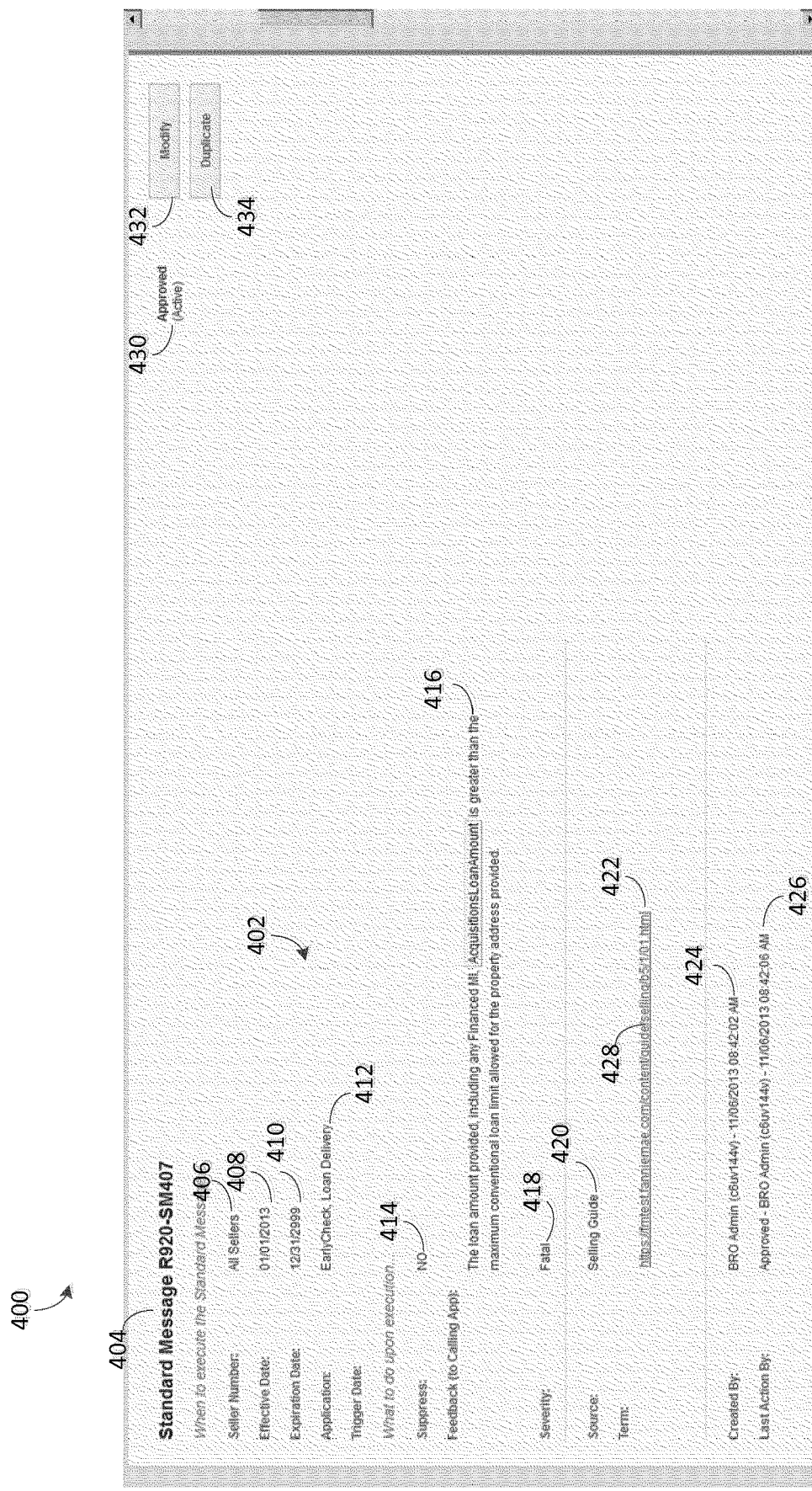
FIG. 4 is a screen display generated by a user interface circuit, showing a standard message associated with a business rule, according to an example embodiment.

Referring to FIG. 4, screen 400 shows a standard message for the business rule of screen 300, according to an example embodiment. The screen 400 includes a heading 404 identifying the standard message based on its rule identifier ("R920"), and an identifier for the standard message itself ("SM407"). The screen 400 also includes a summary overview pane 402 containing a broad summary of information relating to the standard message. The information provided within the pane 402 includes information relevant to when the standard message is triggered, including a seller number 406, an effective date 408, an expiration date 410, and associated applications 412. The seller number 406 indicates the sellers (e.g., lenders) to which the standard message will apply. The effective date 408 and the expiration date 410 provide parameters for when the standard message will be active. The associated applications 412 indicates the customer-facing applications to which the standard message will apply (i.e., the calling applications which will receive the standard message). For example, the standard message may be provided in a format that cannot be communicated via some applications.

The information provided within the pane 402 also includes information indicating the actions that will take place upon execution of the standard message, including a suppression status 414, a feedback message 416, a severity 418, a source 420, a term 422, a creation status 424, a modification status 426, and an approval status 430. The suppression status 414 indicates whether the message will be suppressed. The feedback message 416 indicates the text that will be provided to the customer via the calling customer-facing application. The severity 418 indicates the effect on the status of the loan transaction. In this embodiment, triggering the standard message will be a hard stop to the loan transaction. The source 420 indicates the source of the associated business rule and/or the feedback message. The term 422 indicates the term that was the source of the business rule, including a link 428 that is selectable to view the full text of the term. The creation status 424 indicates when the standard message was created and the user responsible. The modification status 426 indicates when the standard message was last modified and the user responsible for the modification. The approval status 430 indicates whether the standard message has been approved by any required parties. Finally, as with screen 300, screen 400 includes a modify button 432 and a duplicate button 434 to modify or duplicate, respectively, the standard message.

Figure 5:
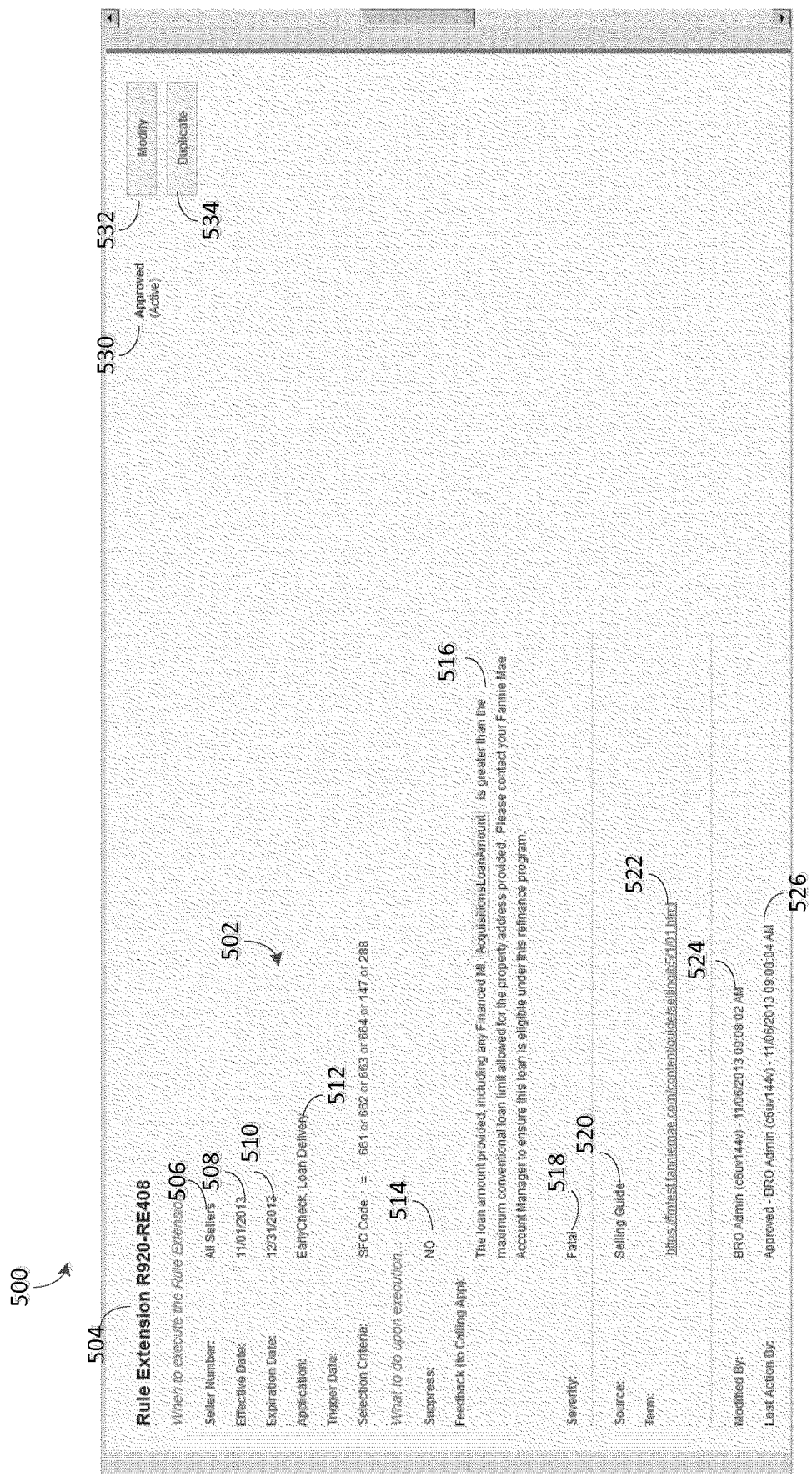
FIG. 5 is a screen display generated by a user interface circuit, showing a rule extension for a business rule, according to an example embodiment.

Referring to FIG. 5, screen 500 shows a rule extension for the business rule of screen 300, according to an example embodiment. In example embodiments, the rule extension circuit 202 can be used to apply a rule extension to a particular business rule. The rule extension suppresses or modifies the associated standard message and/or the message's severity. The rule extension can be applied to a business rule that would otherwise be a hard stop to a loan transaction in order to allow the class of transaction. The rule extension provides flexibility to codify policy variables for temporary rule corrections until they can be hard coded into the business rules engine 110, and for temporary changes due to burn-in periods or issues with sellers. The implemented rule extension typically applies to all sellers.

The screen 500 includes a heading 504 identifying the rule extension based on its rule identifier ("R920") and an identifier for the rule extension ("RE408"). The screen 500 also includes a summary overview pane 502 containing a broad summary of user-configurable information relating to the rule extension. The information provided within the pane 502 is similar to the information provided within the pane 402, but relates to the rule extension rather than the standard message. For example, the pane 502 includes information relevant to when the rule extension is applied, including a seller number 506, an effective date 508, an expiration date 510, and associated applications 512. The pane 502 also includes information indicating the actions that will take place upon execution of the rule extension, including a suppression status 514, a feedback message 516, a severity 518, a source 520, a term 522, a creation status 524, a modification status 526, and an approval status 530. Finally, similar to screens 300 and 400, the screen 500 includes a modify button 532 and a duplicate button 534 to modify or duplicate, respectively, the rule extension.

Figure 6:
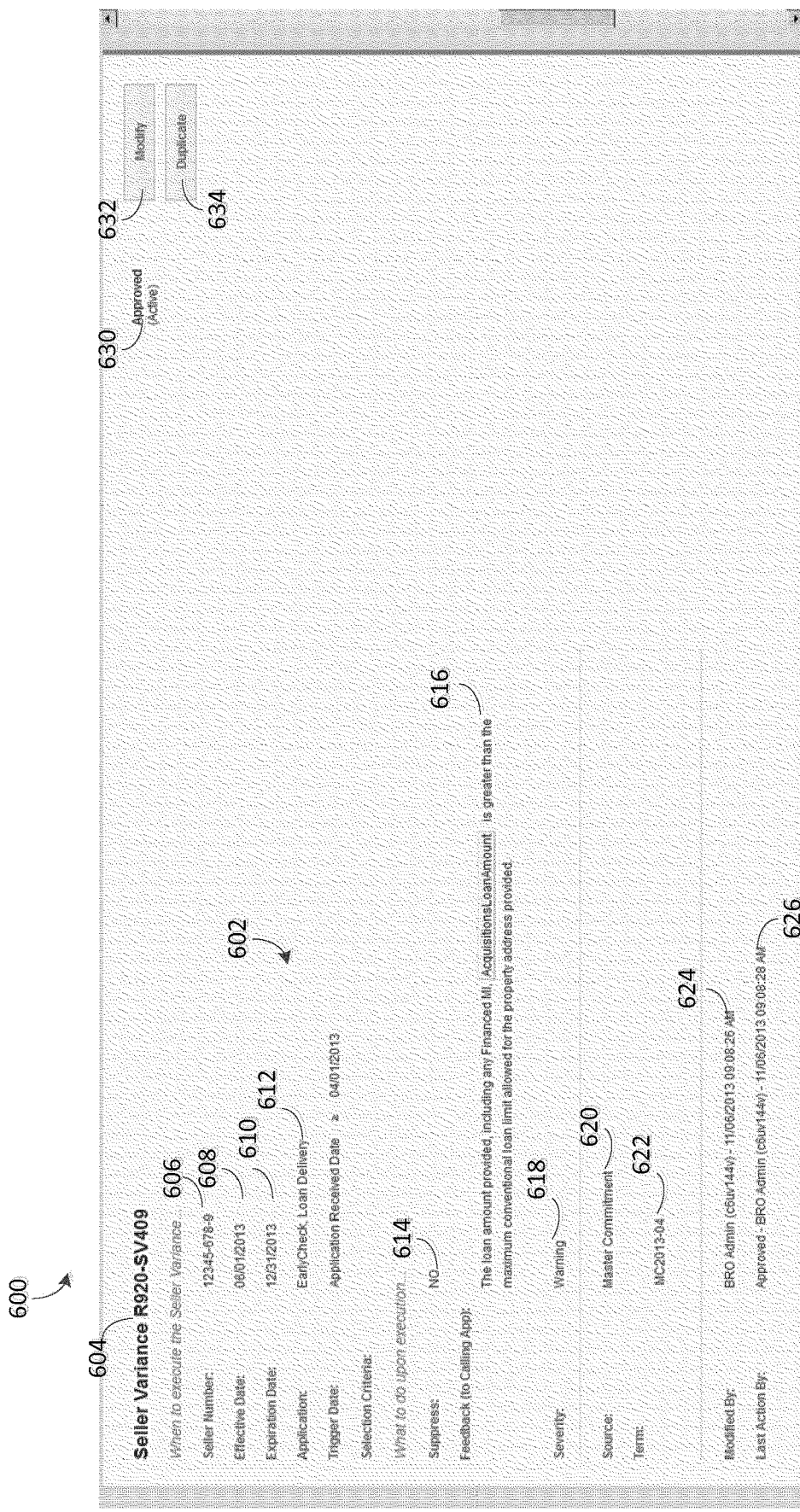
FIG. 6 is a screen display generated by a user interface circuit, showing a rule-based seller variance for a business rule, according to an example embodiment.

Referring to FIG. 6, screen 600 shows a rule-level seller variance for the business rule shown in screen 300, according to an example embodiment. In example embodiments, the seller variance circuit 204 can be used to apply a rule-level seller variance to a particular business rule. The rule-level seller variance suppresses or modifies the associated standard message and/or the message's severity based on the seller of the loan (e.g., the customer, vendor, etc.). The rule-level seller variance provides flexibility to manage policy variances for specific sellers and for temporary changes due to burn-in periods or seller issues. The seller variance may be applied to a particular seller number, name, or other identifier.

The screen 600 includes a heading 604 identifying the rule-level seller variance based on its rule identifier ("R920") and an identifier for the seller variance ("SV409"). The screen 600 also includes a summary overview pane 602 containing a broad summary of information relating to the seller variance. The information provided within the pane 602 is similar to the information provided within panes 402 and 502, but relates specifically to the seller variance applied to the rule. For example, the pane 602 includes information relevant to when the seller variance is executed, including a seller number 606, an effective date 608, an expiration date 610, and associated applications 612. The pane 602 also includes an indication of the actions that will take occur upon execution of the seller variance, including a suppression status 614, a feedback message 616, a severity 618, a source 620, a term 622, a modification status 624, a last action status 626, and an approval status 630. Finally, similar to the previous screens, the screen 600 includes a modify button 632 and a duplicate button 634 to modify or duplicate, respectively, the seller variance.

Figure 7:
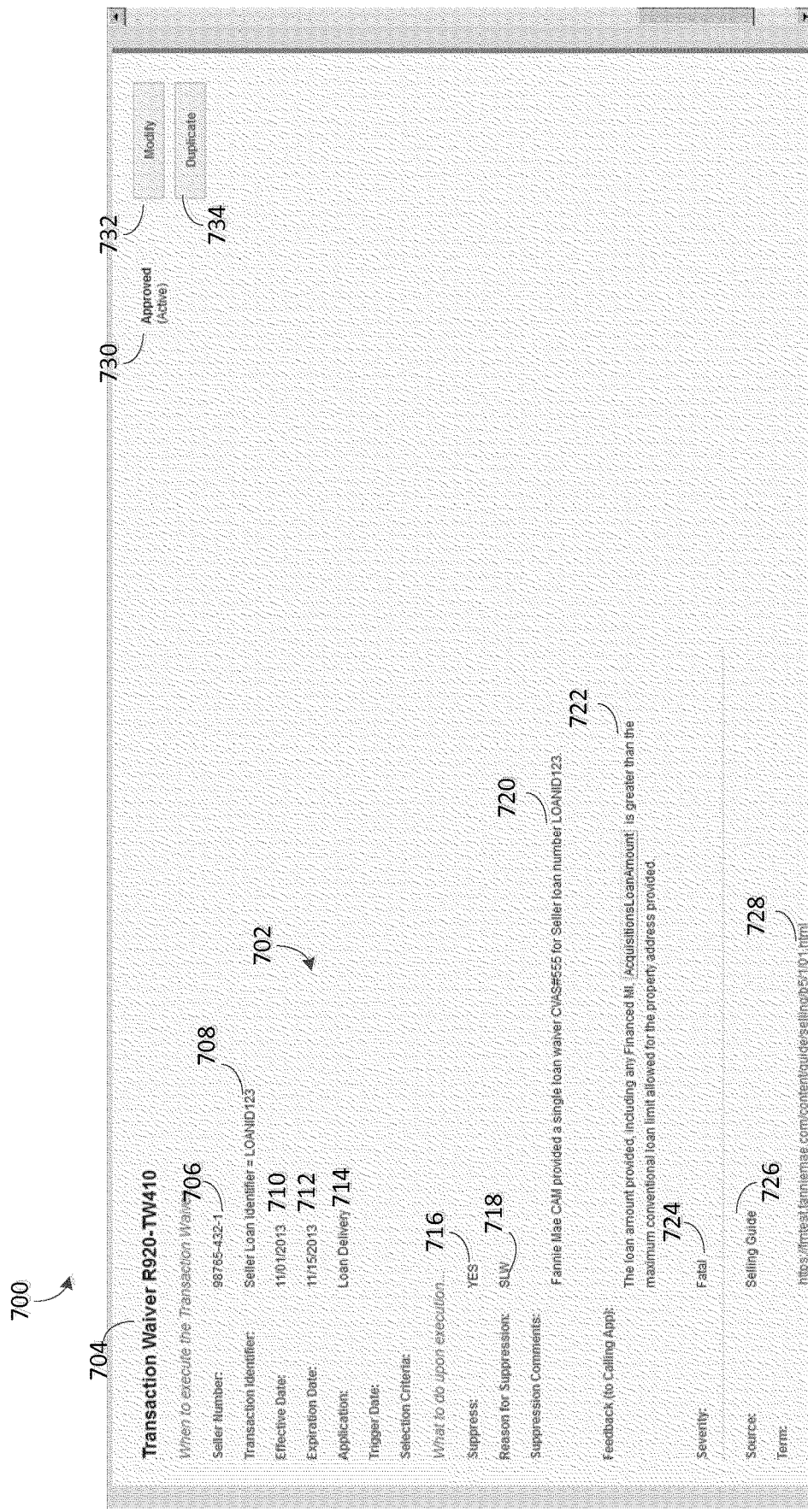
FIG. 7 is a screen display generated by a user interface circuit, showing a transaction-based waiver for a business rule, according to an example embodiment.

Referring to FIG. 7, screen 700 shows a transaction waiver for the business rule shown in screen 300, according to an example embodiment. In example embodiments, the transaction waiver circuit 206 can be used to apply a waiver to a business rule based on a particular transaction (e.g., loan sale) or group of transactions. When applied, the transaction waiver suppresses or modifies the standard message and/or the message's severity based on the particular transaction. The transaction waiver may be applied to a specific commitment, pool, or loan. The transaction waiver may be selected from a list of unique identifiers provided using the transaction waiver circuit 206.

The screen 700 includes a heading 704 identifying the transaction waiver based on its rule identifier ("R920") and an identifier for the transaction waiver ("TW410"). The screen 700 also includes a summary overview pane 702 containing a broad summary of information relating to the transaction waiver. The information is similar to that found in previous screens, but includes a transaction identifier 706 having a unique identification number to identify the applicable transaction or group of transactions. The screen 700 also includes a reason for suppression 708 and suppression comments 710. In this embodiment, the business rule and/or standard message is suppressed based on a single loan waiver (SLW) for seller loan number LOANID123.

Figure 8:
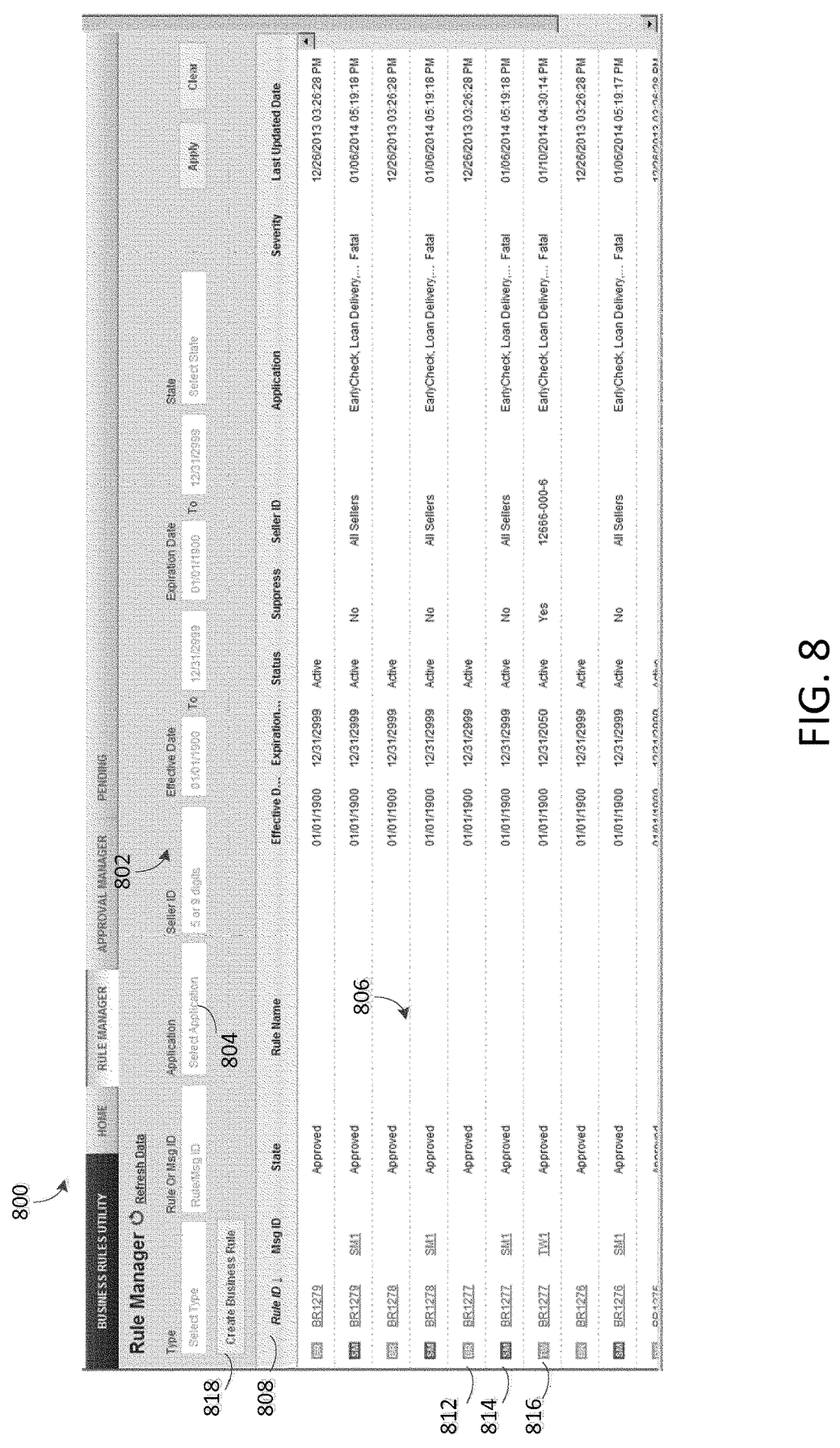

Referring now to FIG. 8, another example screen display is shown for use with the business rules administration tool. Screen 800 is provided by the user interface circuit 112 in combination with the administration circuit 116, and using information stored at the data storage system 122. Screen 800 shows a rule manager, which is an analysis and research tool that can be used by the user to view the current, future, or past business rule metadata and feedback messages. For example, the screen 800 includes a search area 802 where the user can search for stored business rules. The search area 802 includes text boxes 804 in the example embodiment, but in other embodiments the search area 802 could include drop down menus based on the available business rules (i.e., the rules stored in the data storage system 122). In the example embodiment, the user can search based on the type of rule, rule or message ID, application, seller ID, effective date, expiration date, and the current state. In other embodiments, the user can search based on any other information described herein in relation to the business rules.

The screen 800 also includes a rules area 806 that includes a number of business rules associated with the secondary mortgage market. The rules area 806 includes pertinent information for identifying the listed business rules. For example, the rules area 806 includes identifying information such as a rule ID 808 and a message ID 810. The rules area 806 also lists any overrides or other modifiers associated with the listed business rules. For example, the rules area 806 includes a business rule 812 ("BR1277") along with its associated standard message 814 and transaction waiver 816. The user can also create a new business rule from the screen 800 by interacting with button 818.

Referring now to FIG. 9, screen 900 shows an approval workflow tool, according to an example embodiment. The approval workflow tool may be used by the user to manage business rules and/or feedback messages that are awaiting approval. The approval workflow tool may also be used to maintain the separation of duties within an organization using specific user roles and permissions. For example, the approval workflow tool can be used to restrict which users (e.g., editors, approvers, super users, administrators, etc.) are allowed to create, modify, approve, or reject business rules. The approval workflow tool can also be used to establish checks and balances within an organization, requiring one or more persons to approve a change before it is implemented.

The screen 900 includes a rules area 902 that includes business rules and modifications requiring approval or some other action by the user to activate. The rules area 902 includes information for each of the rules, including a current state 904 and status 906. The state 904 of each of the listed rules is "Pending Approval," while the status 906 is "Inactive" until the items are approved. The screen 900 also includes a search area 908 where the user can search for business rules requiring approval or some other action. The search area 908 allows the user to search for pending rules based on the type, rule or message ID, application, seller ID, pending queue, and last action date. The search area 908 includes text boxes 910 and drop down menus 912 for providing search terms.

Figure 10:
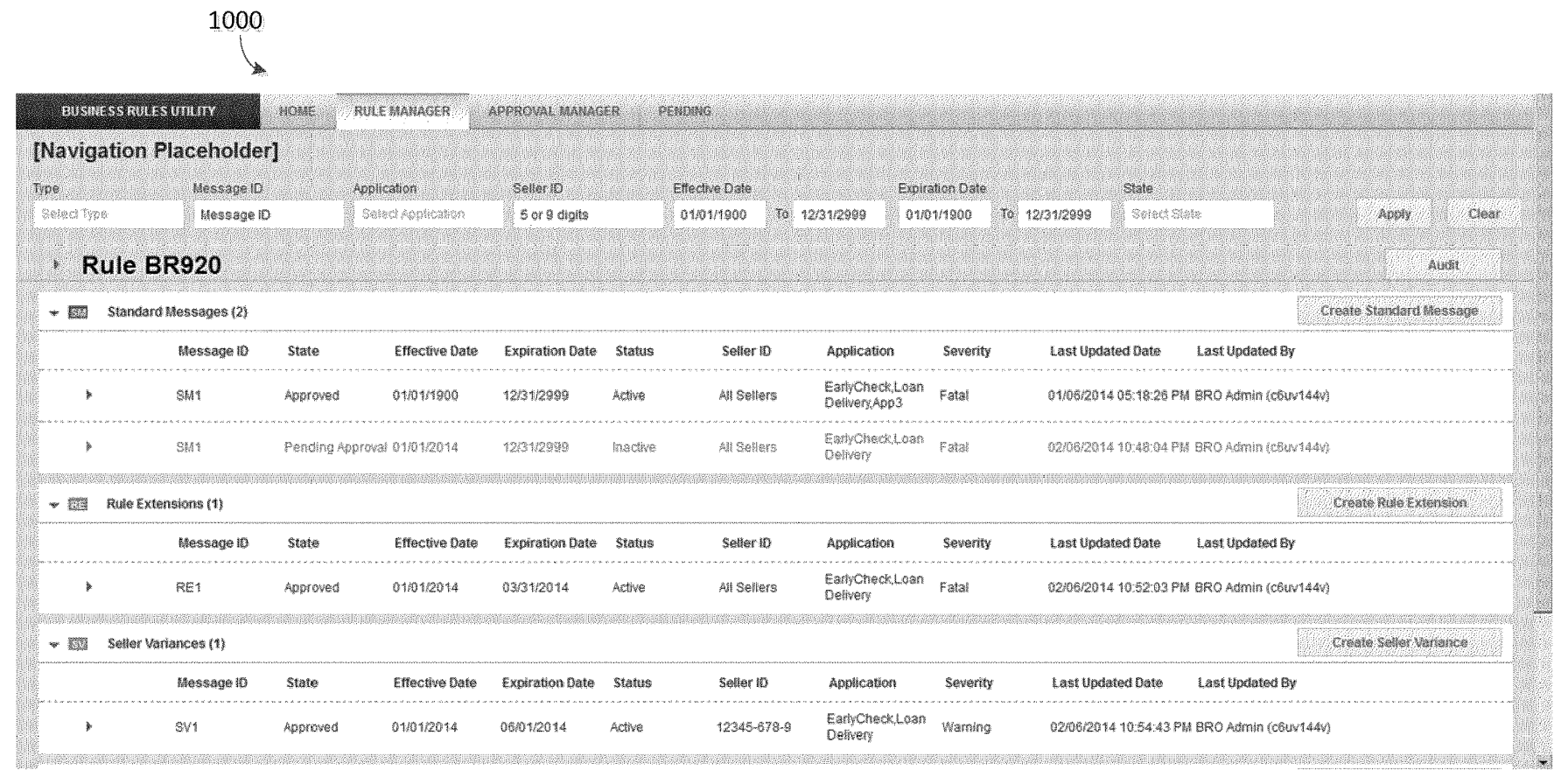

Referring now to FIG. 10, screen 1000 shows a data management tool, according to an example embodiment. The data management tool may be used by the user to manage business rule metadata and associated feedback messages, which includes the external message intended for the customer, the severity, source/term and selection criteria to determine the message's applicability. The data management tool may be used by the user to maintain a historical record of business rule configurations and maintain an audit trail for all user-initiated data changes within the business rule metadata and feedback messages, including the date, time, and associated user. The screen 1000 includes a heading 1002 that identifies the business rule being displayed. The screen 1000 also includes all standard messages 1004, rule extensions 1006, and seller variances 1008 associated with the business rule, including those that are inactive. The screen also includes buttons 1010, 1012, and 1014 that the user may interact with to create a standard message, rule extension, and seller variance, respectively, that is associated with the business rule.

Figure 11:
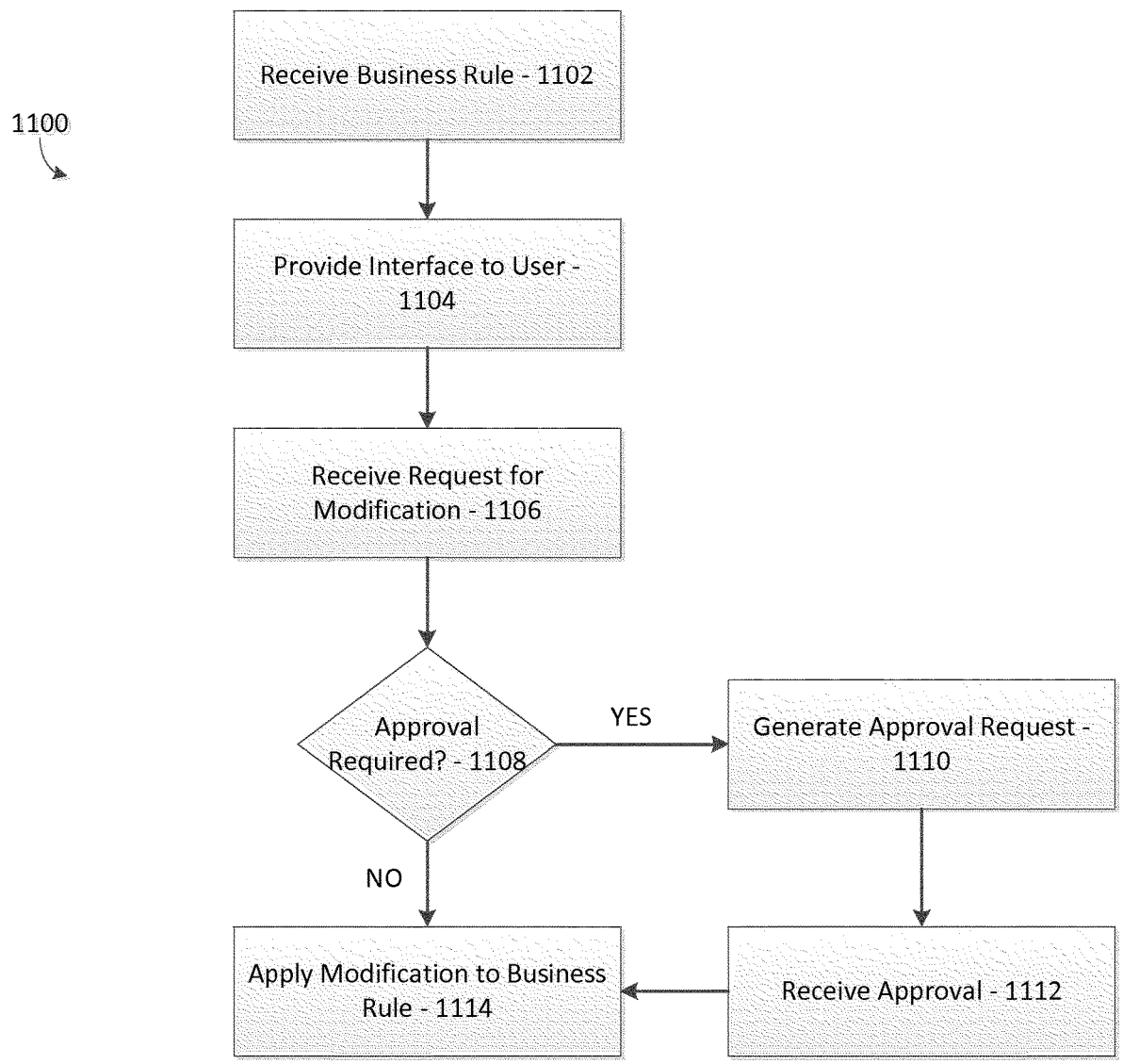
FIG. 11 is a block flow diagram of a method of modifying the application of a business rule using a business rules management system, according to an example embodiment.

Referring now to FIG. 11, a method 1100 of applying an override to a business rule is shown, according to an example embodiment. The method 1100 can be performed by one or more computing systems associated with a purchaser, including the business rules management system 104 of FIG. 1.

At 1102, a business rule is received by the business rules management system 104. The business rule may be received from the business rules engine 110. The business rule may also be received from a user of the system 104. In both cases, the business rule may be received using the user interface circuit 112. In an example embodiment, the business rule is applicable to the purchase of a mortgage loan in the secondary mortgage market. For example, the business rule may be related to the amount of the original mortgage loan. Upon receipt, the business rule may be stored at the data storage system 122.

At 1104, a user interface is provided to the user by the business rules management system 104. The user interface may be provided upon request by the user. The user interface may also be provided in response to another trigger, such as receipt of the business rule. The user interface includes information related to the business rule, such as is shown in the screen 300 of FIG. 3. In an example embodiment, the user interface is generated by the business rules management circuit 114 using information accessed from the data storage system 122, then displayed to the user at the user system 106 using the user interface circuit 112. In some embodiments, the user interface is provided to the user system 106 using a secure network application.

At 1106, a request is received to modify the business rule. The request may be received from the user via the user interface circuit 112. The request includes a specific modification to be made to the business rule. For example, the request may be for a rule extension that completely suppresses the standard feedback message with regard to all sellers. The request may also be for a rule-level seller variance that suppresses the standard feedback message for one or more specified sellers or vendors. The request may also be for a transaction waiver that overrides the standard feedback message for a specified loan transaction or group of transactions.

At 1108, the business rules management system 104 determines whether approval is required to implement the requested modification. The approval manager tool may be consulted to determine if any approval requirements are associated with the business rule, the standard message, or any related messages or overrides. The system 104 may access the data storage system 122 to determine whether an approval is required. If not, the requested modification is applied to the business rule at 1110, and the modification is stored with the business rule at the data storage system 122.

If approval is required to process the modification, an approval request is generated and sent to the appropriate party or parties at 1112. For example, the approval manager tool may be utilized to alert an approver that approval is required to modify a business rule. The approver may be provided with information related to the request, including identification of the business rule, information regarding the requested modification, and identification of the requesting party. The approval request may be generated as a user interface and sent to the user via the user system 106 via the user interface circuit 112.

At 1114, approval is received from the approving party. Approval may be received at the business rules management system 104 via the user interface circuit 112. Once the approval is received, the requested modification is applied to the business rule and the modification is stored with the business rule to be applied accordingly.

Figure 12:
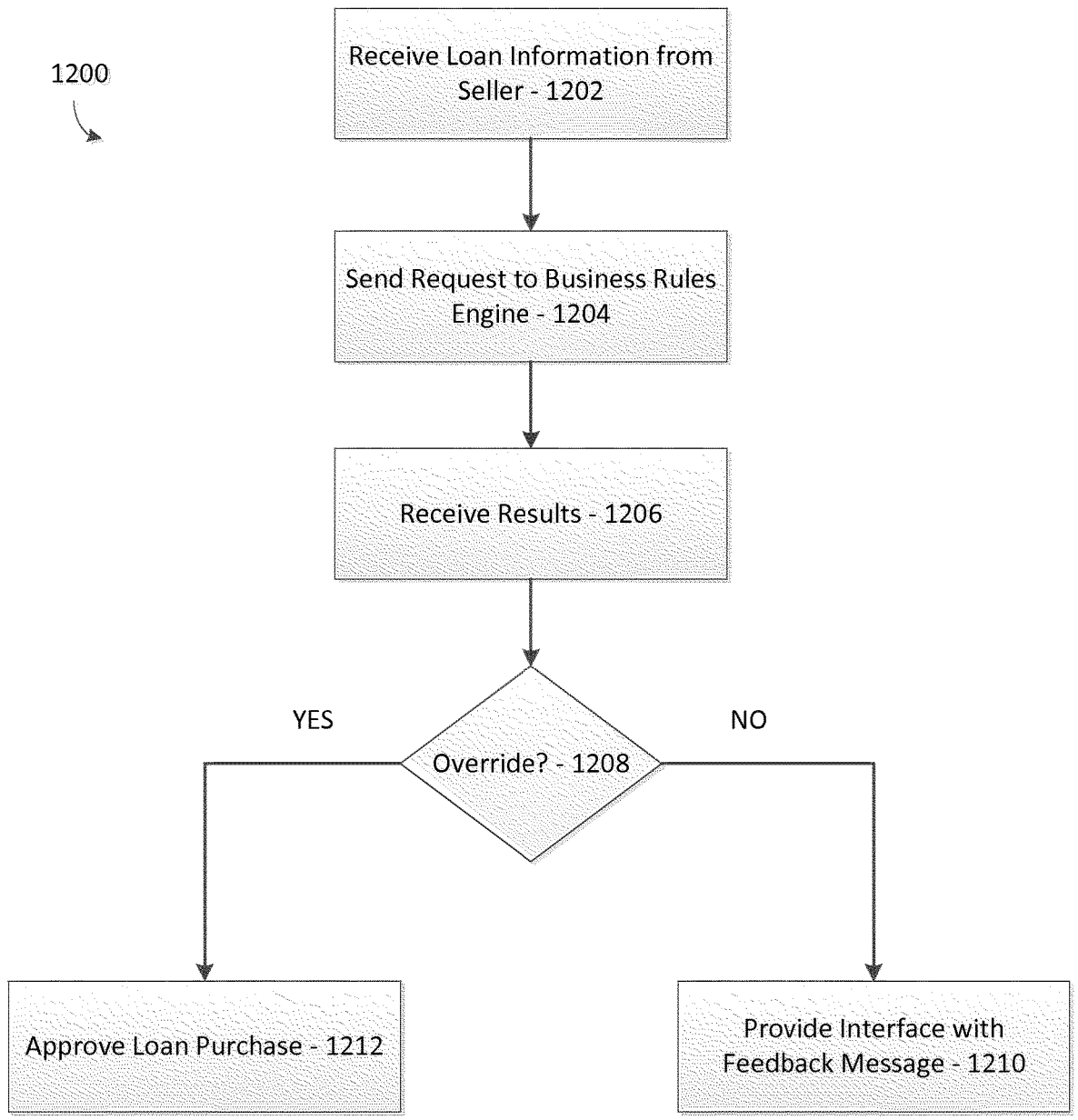
FIG. 12 is a block flow diagram of a method of processing rules engine results using a business rules management system, according to an example embodiment.

Referring now to FIG. 12, a method 1200 of processing rules engine results is shown, according to an example embodiment. In this embodiment, the rules engine results are processed by the business rules management system 104. The results may be processed to determine whether a mortgage loan should be purchased by an associated purchaser in the secondary mortgage market pursuant to company policy and regulations. For example, the business rules engine may apply stored business rules to loan information to determine the business benefits of purchasing the associated loan.

At 1202, loan information is received from the seller (e.g., the customer, lender, mortgage originator). The loan information is related to a mortgage loan to be sold on the secondary mortgage market. In an example embodiment, the loan information is received by the business rules management system 104 using a lender-facing application (e.g., customer application 108). The lender-facing application may interact with the business rules management system 104 for the purpose of providing loan information for prospective loan purchases.

At 1204, a request is sent to the business rules engine 110 to execute one or more business rules related to the loan information. The loan information is sent with the request. In some embodiments, the business rules management system 104 formats the loan information to meet the communication standards of the business rules engine 110 prior to sending the loan information. In some embodiments, the business rules management system 104 interprets the loan information and specifies which business rules should be executed by the business rules engine 110. The request is sent to the business rules engine 110 using the user interface circuit 112.

At 1206, the business rules management system 104 receives results from the business rules engine 110. The results are based on execution of one or more business rules with regard to the loan information. In some embodiments, the results are binary, indicating only whether the loan information complies with the business rules of the entity associated with the business rules management system 104 (i.e., a secondary market purchaser). In other embodiments, the business rules engine 110 provides more comprehensive or data-based results which must be interpreted by the business rules management system 104 to determine a purchasing strategy. In the example embodiment, the results include a standard message associated with one or more business rules, indicating that the loan information does not comply with the business rules utilized by the business rules engine 110 and/or utilized by the business rules management system 104.

At 1208, the business rules management system 104 determines whether to override the standard message. The business rules management system 104 makes the determination based on the override rules stored in the data storage system 122. The override rules may have been generated by an internal user of the business rules management system 104 (e.g., an employee of the secondary market purchaser). For example, the override rules may include a rule extension that suppresses the standard message for all sellers, a rule-level seller variance that suppresses delivery of the message based on the seller, or a transaction waiver that suppresses delivery of the message based on the specific transaction or group of transactions.

If there is no override that is met by the loan information, then the business rules management system 104 sends a feedback message to the customer system 102 at 1210, indicating that the loan is deficient, or otherwise does not meet the purchaser's purchasing standards. If, however, there is an override provision that applies and overrides the feedback message, the business rules management system 104 may approve the loan purchase at 1212.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that performs particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method performed by a business rules orchestrator computing system comprising a processor, memory and computer-executable instructions stored thereon, the computer-executable instructions, when executed by the processor, structured to perform operations comprising:

generating, by an administration circuit of the business rules orchestrator computing system, a business rule comprising a multiple-selection computer application identifier property, the multiple-selection computer application identifier property structured to hold a plurality of computer application identifiers such that the business rule is made applicable across a plurality of customer-facing computer applications based on the plurality of computer application identifiers, the business rule being deployable without modifying source code of the plurality of the customer-facing computer applications, wherein being deployable without modifying source code decreases production update time for at least one of a rule message, a severity, and an override, and the business rule comprising a first instance of metadata related to the business rule and stored on a data storage media associated with the business rules orchestrator computing system;

providing, by a user interface circuit of the business rules orchestrator computing system, an interface to a computing device operated by a user of the system, wherein the interface is structured to display the business rule;

receiving, by the administration circuit of the business rules orchestrator computing system, a request from the user via the interface, the request including a modification of the business rule, wherein the modification comprises a rule logic override related to modifying a user-selected subset of customer-facing computer applications from the plurality of customer-facing computer applications; and applying, by the administration circuit, the modification to the business rule for the user-selected subset of customer-facing computer applications based on the request, comprising the operations of:
- generating a second instance of metadata related to the business rule, wherein the second instance of metadata is associated with the rule logic override that modifies the user-selected subset of customer-facing computer applications; and
- storing the second instance of metadata on the data storage media;

wherein both the first instance of metadata and the second instance of metadata remain selectable for execution of either the business rule or the modification via the user interface circuit, wherein the metadata is searchable by filtering on a desired customer-facing computer application.

2. The method of claim 1, further comprising:
assigning an approver to the business rule based on a message received from an administrator via the interface; and
receiving approval from the approver via the interface.

3. The method of claim 2, further comprising, upon receiving the request from the user:
determining the approver based on the business rule; and
generating an approval request at the interface based on the approver.

4. The method of claim 2, wherein the approver includes two or more associated persons.

5. The method of claim 1, wherein the request from the user includes an expiration date associated with the modification.

6. The method of claim 5, further comprising deactivating the modification upon the expiration date.

7. The method of claim 1, wherein the business rule is associated with a feedback message, and wherein applying the modification includes suppressing the feedback message.

8. A business rules orchestrator computing system, comprising a processor, memory, and a user interface circuit comprising computer-executable instructions stored in the memory, the computer-executable instructions, when executed by the processor, structured to perform the following operations:
generate a business rule comprising a multiple-selection computer application identifier property, the multiple-selection computer application identifier property structured to hold a plurality of computer application identifiers such that the business rule is made applicable across a plurality of customer-facing computer applications based on the plurality of computer application identifiers, the business rule being deployable without modifying source code of the plurality of the customer-facing computer applications, wherein being deployable without modifying source code decreases production update time for at least one of a rule message, a severity, and an override, and the business rule comprising a first instance of metadata related to the business rule and stored on a data storage media associated with the business rules orchestrator computing system;
provide an interface to a computing device operated by a user of the system, wherein the interface is structured to display the business rule
receive a request from the user via the interface, the request including a modification of the business rule, wherein the modification comprises a rule logic override related to modifying a user-selected subset of customer-facing computer applications from the plurality of customer-facing computer applications; and
a rules management circuit structured to apply the modification, comprising circuitry structured to:
  generate a second instance of metadata related to the business rule, wherein the second instance of metadata is associated with the rule logic override that modifies the user-selected subset of customer-facing computer applications; and
  store the second instance of metadata on the data storage media;
wherein both the first instance of metadata and the second instance of metadata are selectable for execution of either the business rule or the modification via the user interface circuit, wherein the metadata is searchable by filtering on a desired customer-facing computer application.

9. The system of claim 8, wherein the rules management circuit is further structured to assign an approver to the business rule based on a message received from an administrator via the interface, and wherein the user interface circuit is further structured to receive approval from the approver via the interface.

10. The system of claim 9, wherein the rules management circuit is structured to, upon receipt of the request from the user:
determine the approver based on the business rule; and
generate an approval request at the interface based on the approver.

11. The system of claim 9, wherein the rules management circuit is structured to assign two or more associated persons as the approver.

12. The system of claim 8, wherein the request from the user includes an expiration date associated with the modification.

13. The system of claim 12, wherein the rules management circuit is structured to deactivate the modification upon the expiration date.

14. The system of claim 8, wherein the business rule is associated with a feedback message, and wherein applying the modification includes suppressing the feedback message.

15. The method of claim 1, wherein the business rule is associated with an external message intended for a customer.

16. The method of claim 15, wherein the modification modifies at least one of a text, a trigger date, and a severity associated with the external message.

17. The method of claim 15, wherein the modification relates to an exception associated with the business rule, further comprising suppressing sending of the external message to the customer based on the exception.

18. The method of claim 17, wherein the exception is related to at least one of a seller and a loan.

\* \* \* \* \*